(12) United States Patent
Jiang

(10) Patent No.: US 6,297,801 B1
(45) Date of Patent: Oct. 2, 2001

(54) EDGE-ADAPTIVE CHROMA UP-CONVERSION

(75) Inventor: Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/393,479

(22) Filed: Sep. 10, 1999

(51) Int. Cl.[7] .................................................... G09G 5/04
(52) U.S. Cl. .................................... 345/154; 348/453
(58) Field of Search ................................ 382/162, 163, 382/164, 165, 166, 167; 345/150, 151, 152, 153, 154, 155; 348/453, 461, 473, 488, 498

(56) References Cited

U.S. PATENT DOCUMENTS

| | | | |
|---|---|---|---|
| 4,233,601 | 11/1980 | Hankins et al. | 340/703 |
| 4,385,293 | 5/1983 | Wisnieff | 340/793 |
| 4,688,031 | 8/1987 | Haggerty | 340/793 |
| 4,703,318 | 10/1987 | Haggerty | 346/723 |
| 4,739,313 | 4/1988 | Oudshoorn et al. | 340/703 |
| 4,924,413 | 5/1990 | Suwannukul | 364/521 |
| 4,956,638 | 9/1990 | Larkey et al. | 340/701 |
| 4,992,862 | 2/1991 | Gabor | 358/76 |
| 5,111,194 | 5/1992 | Oneda | 340/793 |
| 5,113,455 | 5/1992 | Scott | 382/47 |
| 5,400,053 | 3/1995 | Johary et al. | 345/147 |

Primary Examiner—Almis R. Jankus
Assistant Examiner—G. F. Cunningham
(74) Attorney, Agent, or Firm—Thelen Reid & Priest LLP; David B. Ritchie

(57) ABSTRACT

An apparatus and method for scaling-up a set of video data uses variations in the black-and-white components, of a graphic image to better generate "missing" color components in an image. The location of large variations in the black-and-white components of an image, or edges in the black-and-white portion of the image, may be used to generate the missing color components. The variations in the black-and-white components of an image, around a particular location in the image, provide additional information for interpolating between the more widely spaced color component information. The method and apparatus allow for the selection, and adjustment to, the weights given to edge locations. The method and apparatus may be used as part of a computer system to expand and display compressed graphic data.

19 Claims, 6 Drawing Sheets

EDGE-ADAPTIVE CHROMA UP-CONVERSION

BACKGROUND OF THE INVENTION

1. Field of the Invention

The present invention relates to video systems. More particularly, the present invention relates to expanding color samples in a compressed video image.

2. The Background Art

There are many color models used to represent and display color graphics on a computer monitor or color television display. The red, green and blue (RGB) model, or RBG color space, is the most prevalent. With RGB color space the three components are the three primary colors and each corresponds to an intensity that may be used to illuminate the red, green and blue phosphors on a cathode ray tube (CRT). The relationship between each RGB component value and an amount of phosphor illumination makes RGB color space a good choice for video displays. There is a minor complication with RGB color space due to a non-linearity between a video signal voltage and the color intensity displayed on a CRT. The non-linearity is well known to those of ordinary skill in the art and is typically addressed by using "gamma-corrected" RGB values, often denoted R'G'B'. This disclosure will ignore the distinction between RGB and R'G'B' signals and use the term RGB when referring to either.

There are, however, reasons to use color spaces other than RGB for video transfer and storage. First, RGB color space typically requires that all three components have the same number of data bits and resolution. For example, 24 bit video signals, with 8 bits for each of the three RGB components, are commonly used for computer video displays. This can be a disadvantage for some video compression techniques. Second, using video signal processing procedures, such as adjusting the brightness of an image, with RGB color space may require modifying each of the three components separately. Other color space models are more efficient in terms of video signal processing. Third, legacy black-and-white television receivers must be supported. Color television standards, in order to remain compatible with black-and-white receivers, typically added two color information signals for use in conjunction with the black-and-white signal. Standards such as these, while using three components to describe an image, are inherently different from RGB color space.

Modern video systems often use one of three non-RGB color space models, YUV, YIQ and YCbCr. Each uses a luma (or luminance) value, denoted as "Y", to depict the basic black-and-white information in an image. Each model also uses two chroma (or chrominance) values to depict the color information, although they each differ in how the chroma values are defined.

Video compression techniques may take advantage of the separate luma and chroma data fields. For example, chroma data may be sampled at only one-half or one-quarter of the rate used for luma data. Doing so can reduce the size of the video data by one-third or one-half of that with equal sampling. Since human vision tends to be more sensitive to the details represented by the luma data, even a 75% reduction in chroma sampling may not significantly degrade the perceived image quality.

The present invention is directed at an apparatus and method for expanding compressed chroma data. The expanded video format may then be converted to RGB color space for display by techniques well known to those of ordinary skill in the art. The distinctions between the different chroma definitions of YUV, YIQ and YCbCr color space are not particularly important to implementing the present invention and the present invention is not intended to be limited to any particular color space. This disclosure will refer to all such luma and chroma color spaces as YUV, although the data may actually conform to the YIQ or YCbCr formats.

FIG. 1 shows the sequence 10 of converting a compressed YUV format graphic file to a displayed image. The present invention is directed at the "scaling up" process 12. A compressed file 14 is expanded yielding a decompressed file 16, although still in a luma/chroma format, such as YUV. The conversion of the expanded YUV format to a RGB format 18 and the eventual display of the graphic image 20 occur "down stream" of the present invention.

SUMMARY OF THE INVENTION

An apparatus and method for scaling-up a set of video data uses variations in the black-and-white components of a graphic image to generate "missing" color components in an image. The location of large variations in the black-and-white components of an image, or edges in the black-and-white portion of the image, may be used to better generate the missing color components. The variations in the black-and-white components of an image, around a particular location in the image, provide additional information for interpolating between the more widely spaced color component information. The method and apparatus allow for the selection, and adjustment to, the weights given to edge locations in scaling up the video data. The method and apparatus may be used as part of a computer system to expand and display compressed graphic data.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons having the benefit of this disclosure.

The present invention expands color information in a compressed video file. Instead of using linear interpolation between image locations with stored color values, the present invention recognizes that there is often a strong correlation between variation in the black-and-white components of an image and the color components. The correlation is used to detect "edges" in the black-and-white image data and use the edge location to expand, or scale-up, the color data. The technique is referred to an edge-adaptive chroma up-conversion.

Color graphic images typically require three data fields, or components, at each pixel or picture element. The components could be the red, green and blue values used in RGB color space, or the one luma and two chroma values used in YUV color space. There are many other color space models known in the art and they all use three (or more) components to describe a color image.

Figure 1:
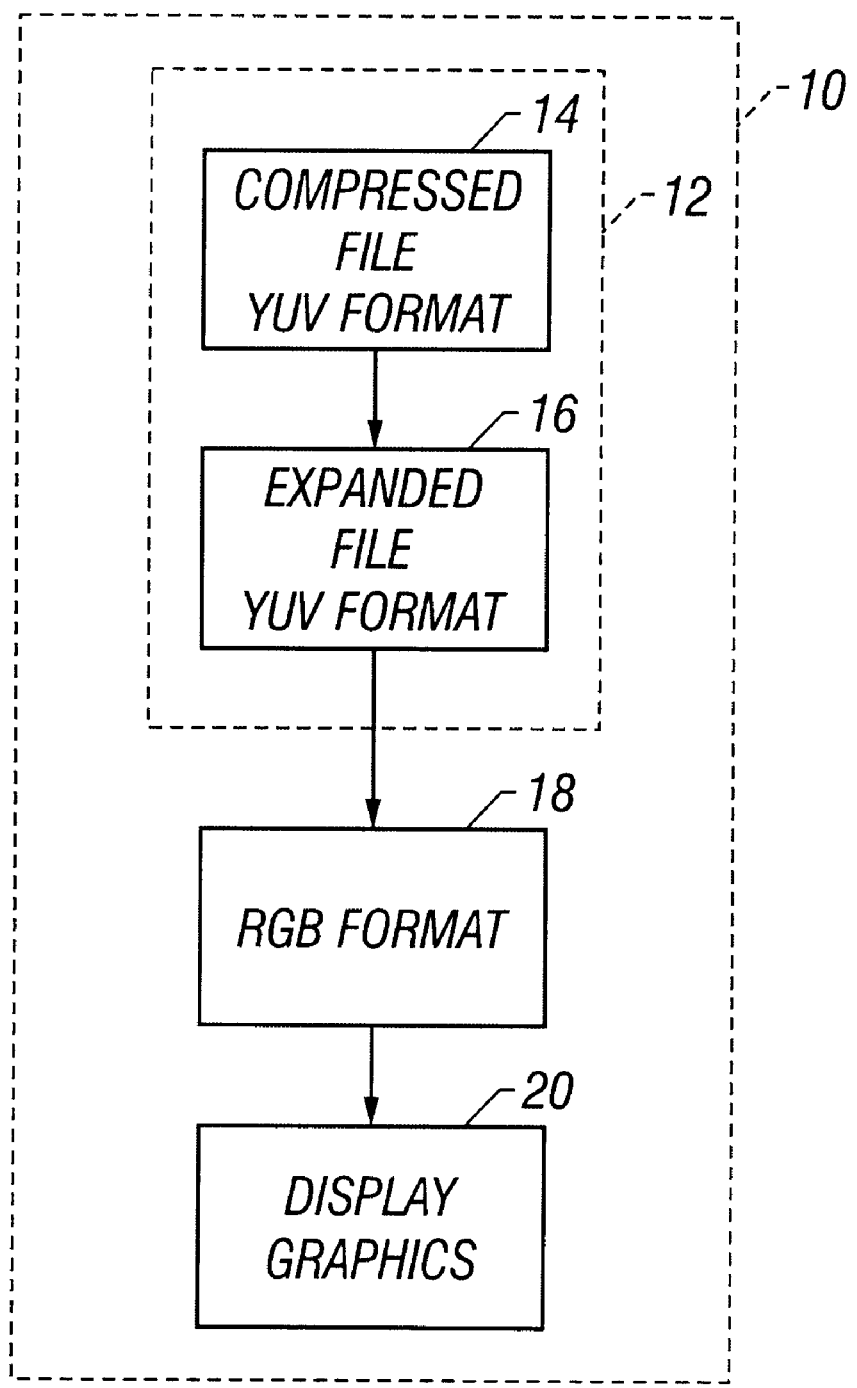
FIG. 1 is a flow diagram of the process of displaying graphic images from compressed video data.
Figure 2A:
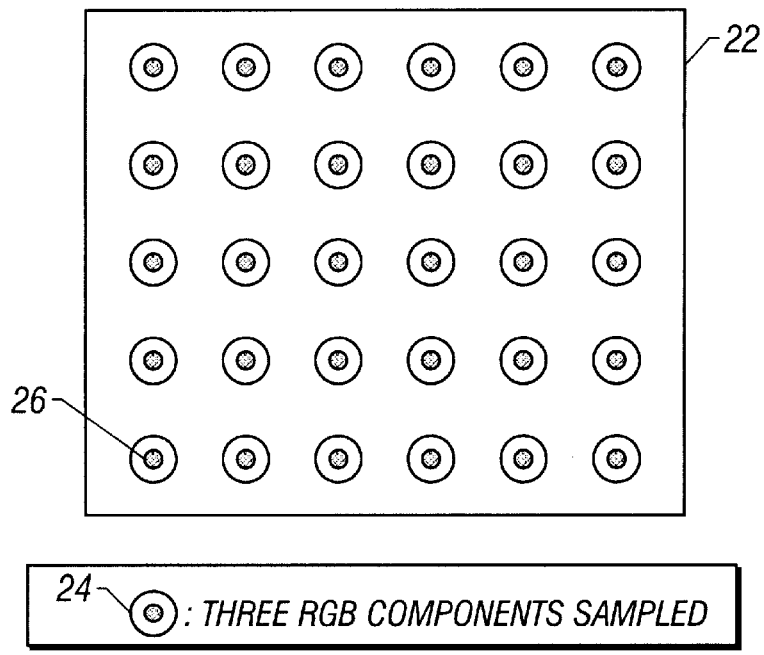
FIG. 2A is a diagram depicting 4:4:4 RGB video sampling.
Figure 2B:
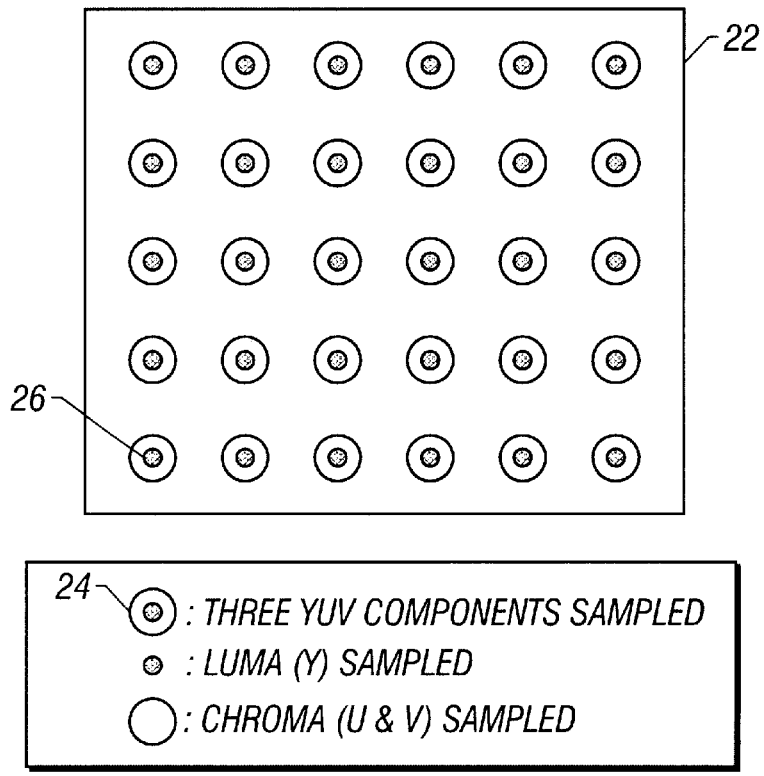
FIG. 2B is a diagram depicting 4:4:4 YUV video sampling.

FIGS. 2A and 2B illustrate orthogonal arrangements of video data samples 22 with three color space components 24 defined at each sample location 26. An arrangement of three video components 24 at each location 26 is referred to as a "4:4:4" format, thus FIG. 2A illustrates a 4:4:4 RGB format and FIG. 2B a 4:4:4 YUV format. The RGB color space values of FIG. 2A may be used to illuminate the red, green and blue phosphors on a CRT. The YUV color space component 24 values of FIG. 2B map directly to those of FIG. 2A, as is known to those of ordinary skill in the art.

A video data file containing the component values 24, such as shown in FIG. 2B, is the output or result of an embodiment of the present invention. Typically, the component values 24 in the YUV color space have the same bit length as the corresponding RGB values, although there is no requirement of equal bit lengths. There is also no requirement that each sample location 26 correspond to a pixel location of the graphics display. For example, the stored video image might be clipped so that some sample locations 26 would not appear on a CRT displaying the graphic image.

Figure 3:
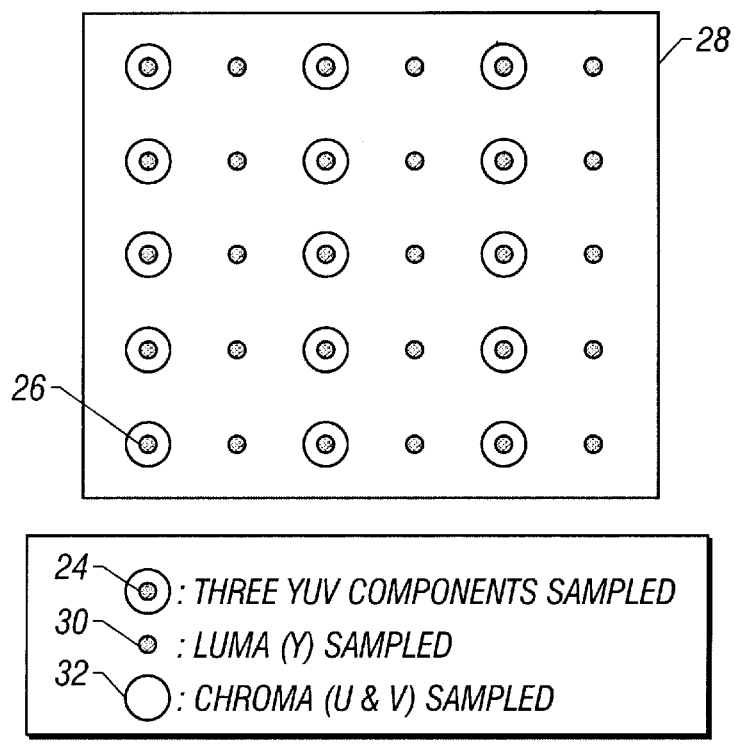
FIG. 3 is a diagram depicting 4:2:2 YUV video sampling.

Referring now to FIG. 3, a compressed orthogonal arrangement of video data samples 28 is shown. This arrangement is referred to as a 4:2:2 YUV format. The luma (Y) values 30 are sampled at twice as many locations as the chroma (U and V) values 32. Arrangement 28 requires storage of only one-half the color data compared to the 4:4:4 format, reducing the total video file size by approximately one-third.

Unlike the one-to-one mapping between the color space components 24 of FIGS. 2A and 2B, arrangement 28 cannot be directly converted to a RGB format for display. All three components (Y,U and V) are required at each location 26 for such a conversion. An intermediate step of creating the missing chroma values, or performing a chroma up-conversion is first required.

Figure 4:
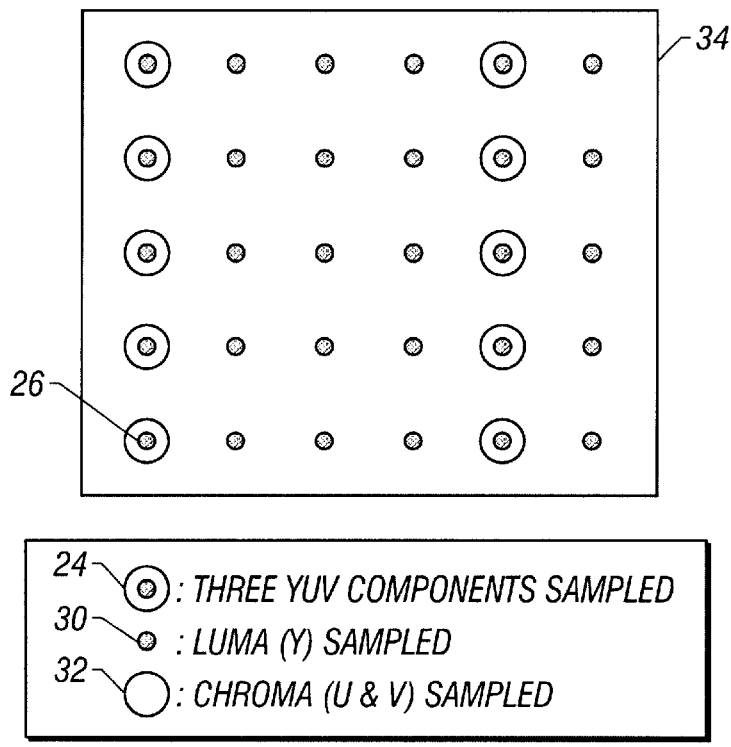
FIG. 4 is a diagram depicting 4:1:1 YUV video sampling.

FIG. 4 illustrates another compressed orthogonal arrangement of video data samples 34, in a 4:1:1 YUV format. The luma (Y) values 30 are now sampled at four times as many locations as the chroma values (U and V) 32. The 4:1:1 YUV format requires approximately one-half the total video file size of a 4:4:4 format, assuming an equal number of bits for each data value. Similar to the 4:2:2 arrangement shown in FIG. 3, the 4:1:1 format requires a chroma up-conversion before it can be converted into a RGB format for display.

Figure 5A:
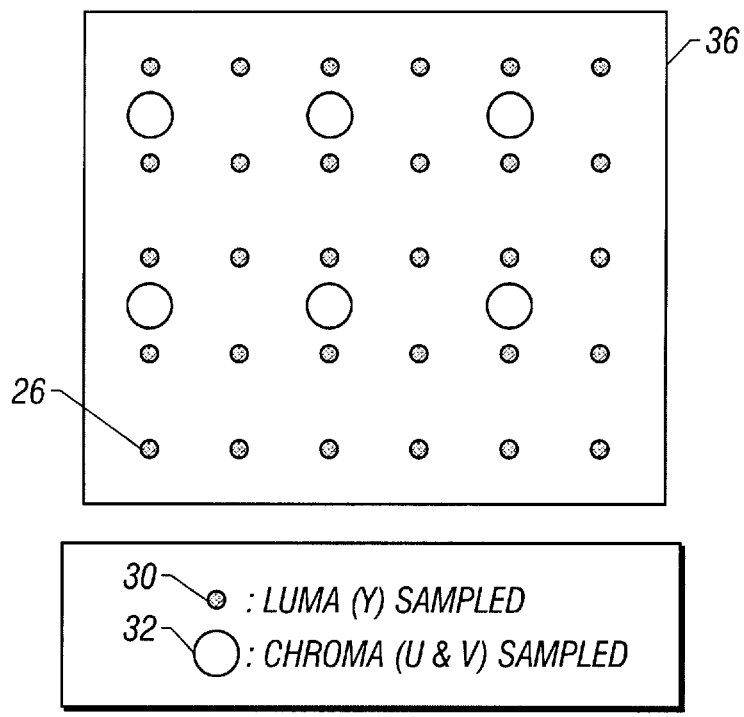
FIG. 5A is a diagram depicting type-1 4:2:0 YUV video sampling used in MPEG 2.

FIG. 5A illustrates another compressed arrangement of video data samples 36, in a type-1 4:2:0 YUV format used in the Motion Pictures Expert Group—2 (MPEG-2) format. The 4:2:0 YUV format uses different locations for the luma samples 30 and the chroma samples 32. Like the above compressed video formats, chroma up-conversion is needed before a 4:2:0 YUV file can be converted to a RGB format.

Figure 5B:
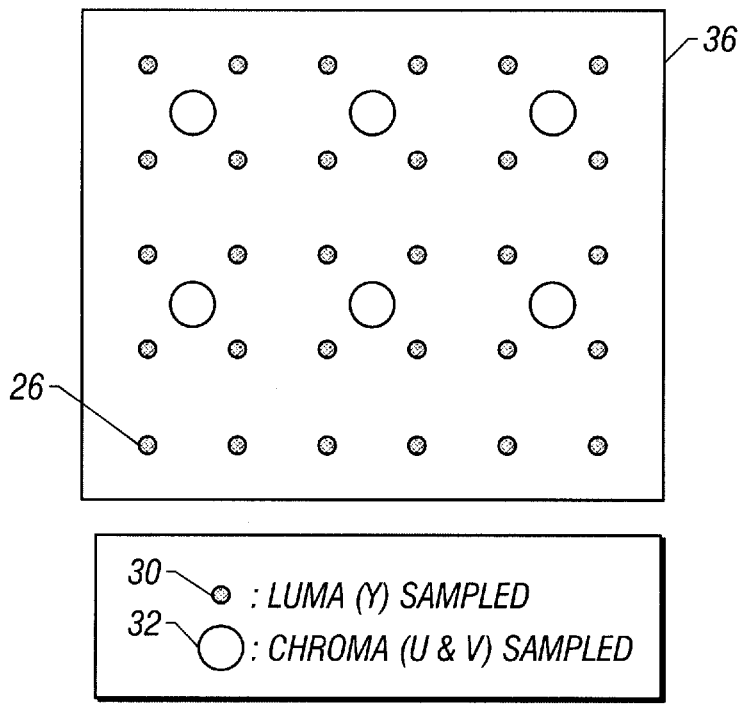
FIG. 5B is a diagram depicting type-2 4:2:0 YUV video sampling used in MPEG 1.

FIG. 5B illustrates another 4:2:0 YUV format, the type-2 format used with MPEG-1. This compressed video also requires a chroma up-conversion before it may be converted to RGB.

Figure 6:
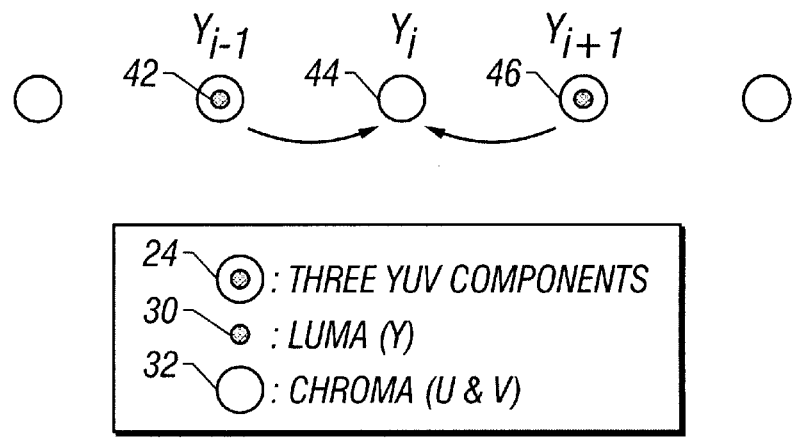
FIG. 6 is a diagram depicting expanding the chroma data to include unsampled locations.

FIG. 6 depicts chroma up-conversion on a 4:2:2 YUV format of samples to a 4:4:4 YUV format. Sample locations 42 and 46 contain luma (Y) and chroma (U and V) data; sample location 44 only luma data. Prior art methods of chroma up-conversion for location 44 use either linear interpolation of the chroma values at locations 42 and 46 or replication of the chroma values at location 42. However, when there is a sharp edge, interpolation may create "color bleeding" artifacts. For example, a boundary between red at location 42 and green at location 46 may cause yellow at location 44. If we can assume a correlation between luma and chroma components, then a high resolution luma component can be used to constrain the recovery of the "missing" chroma values. When a strong edge exists in the Y plane, it is very likely that the U and V components also have edges at the same location. Thus, instead of linear interpolation with a weighting factor as a function of spatial distance, the weighting factor can be adjusted according to the variation in the Y values from location 42 to 44 and 46. For situations where the luma value at location 44 is not within the range defined by the luma values at locations 42 and 46, linear interpolation of chroma values is used.

Using the notation i−1, i and i+1 to describe the Y, U and V values at locations 42, 44 and 46 respectively, we can describe three special cases of edge-adaptive color up-conversion with the following equations:

For $\text{Min}(Y_{i-1}, Y_{i+1}) \leq Y_i \leq \text{Max}(Y_{i-1}, Y_{i+1})$ $$U_i = \begin{cases} U_{i-1} & \text{if } |Y_i - Y_{i+1}| \gg |Y_i - Y_{i-1}| \\ U_{i+1} & \text{if } |Y_i - Y_{i+1}| \ll |Y_i - Y_{i-1}| \\ \dfrac{U_{i-1} + U_{i+1}}{2} & \text{if } |Y_i - Y_{i+1}| \approx |Y_i - Y_{i-1}| \end{cases}$$

$$V_i = \begin{cases} V_{i-1} & \text{if } |Y_i - Y_{i+1}| \gg |Y_i - Y_{i-1}| \\ V_{i+1} & \text{if } |Y_i - Y_{i+1}| \ll |Y_i - Y_{i-1}| \\ \dfrac{V_{i-1} + V_{i+1}}{2} & \text{if } |Y_i - Y_{i+1}| \approx |Y_i - Y_{i-1}| \end{cases}$$

Otherwise:

$$U_i = \frac{U_{i-1} + U_{i+1}}{2}$$

$$V_i = \frac{V_{i-1} + V_{i+1}}{2}$$

Using this technique, the luma values are examined to locate edges, that is locations where there is a large change in the Y values. If such an edge exists, the missing chroma values are created so that a color edge matches the location of the black-and-white edge.

In general the chroma up-conversion can be described by the following equations:

$U_i = \alpha_i(Y)U_{i-1} + (1 - \alpha_i(Y))U_{i+1}$ $V_i = \alpha_i(Y)V_{i-1} + (1 - \alpha_i(Y))V_{i+1}$ where the interpolation coefficient $\alpha_i(Y)$ is a function of the Y components, or more properly, a function of the Y gradient defined by the following equation:

$$Y \text{ gradient} = \frac{Y_{i+1} - Y_i}{Y_{i+1} - Y_{i-1}}$$

Specifically, for:

$\text{Min}(Y_{-1}, Y_{i+1}) - \delta_L \leq Y_i \leq \text{Max}(Y_{i-1}, Y_{i+1}) + \delta_H$ $\alpha_i(Y) = |Y\text{gradient}|$ Otherwise:

$\alpha_{i(Y)} = \frac{1}{2}$.

The range thresholds $\delta_L$ and $\delta_H$, all non-negative values, are used to compensate minor intensity fluctuation of luma components. The use of $\delta_L$ and $\delta_H$, is especially useful around edge area where overshoot or undershoot may occur when the luma components are processed through a digital or an analog filter.

The Y gradient is a measure of how much of the total change in luma values, between locations 42 and 46, occurs in the first and second segments. For example, a large portion of the total change occurring between locations 42 and 44 is indication of an edge between locations 42 and 44 in the luma plane. If there is a strong edge between locations 42 and 44, then most of the change in chroma values should also occur there. Stated differently, since locations 42 and 44 have such different values, the chroma values at location 42 should have much less of an influence on the new chroma values for location 44 than those from location 46. The interpolation coefficient $\alpha_i(Y)$ determines the influence of the edge on the chroma up-conversion. For situations where the luma value at location 44 is outside the range of values defined by locations 42 and 46, linear interpolation is used. Linear interpolation is the equivalent of setting $\alpha_i(Y)$ equal to one-half.

Figure 7A:
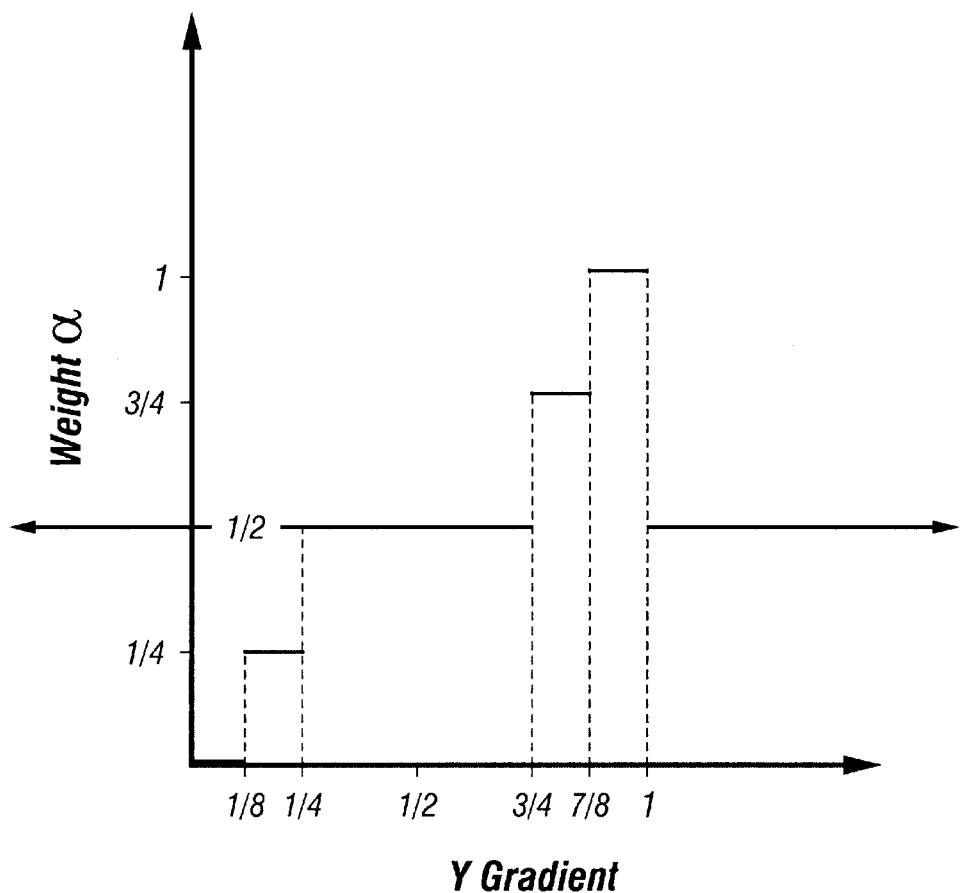
FIGS. 7A and 7B are plots of interpolation functions for expanding the chroma data in accordance with two different embodiments of the present invention.
Figure 7B:
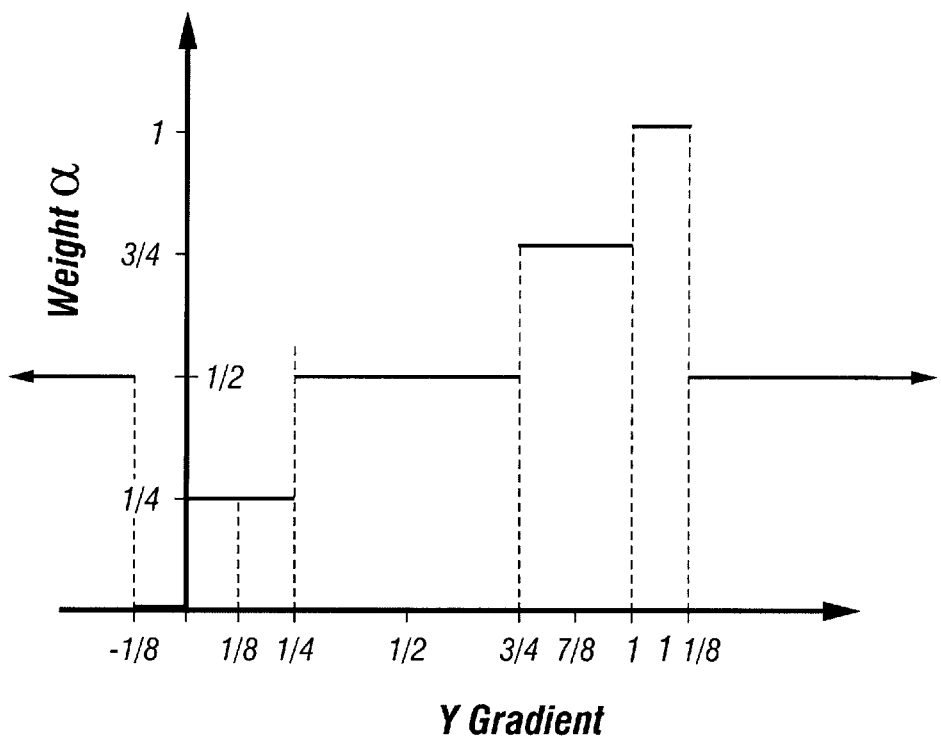

One embodiment of the current invention uses the interpolation function in FIG. 7A where the range thresholds $\delta_L$ and $\delta_H$, are set to zero, however, the present invention is not intended to be limited to any particular interpolation function. Another embodiment of the current invention uses the interpolation function in FIG. 7B, where the range thresholds $\delta_L$ and $\delta_H$, are set to ⅛ and the 8 weight a varies slightly from those of FIG. 7A for some Y gradient values. Those of ordinary skill in the art will readily recognize that other forms of interpolation functions may also be used with edge-adaptive chroma up-conversion. Step-functions, such as shown in FIGS. 7A and 7B, have the advantage of allowing the computations to be implemented with adders and shifters. The use of adders and shifters, instead of multipliers or dividers, typically allows for faster processing of the video data and the resulting lower hardware implementation cost.

Figure 8:
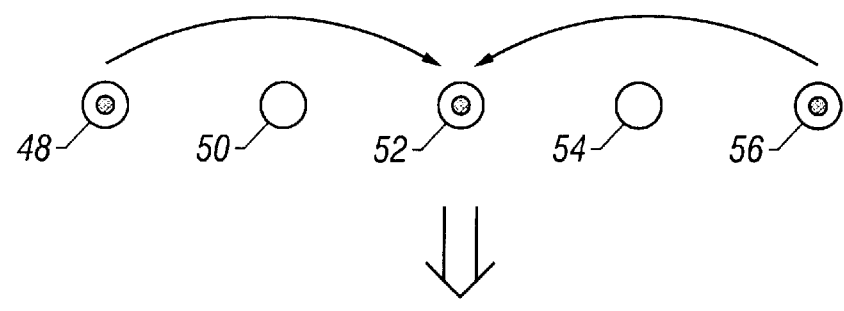
FIG. 8 is a figure which depicts converting a 4:1:1 format file to 4:4:4 format.
Figure 8:
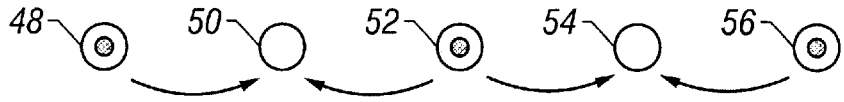

A chroma up-conversion from a 4:1:1 YUV format, such as shown in FIG. 4, to a 4:4:4 YUV format may be performed in multiple steps. Referring now to FIG. 8, sample locations 48 and 56 contain luma and chroma values; sample locations 50, 52 and 54 only luma data. First, chroma up-conversion is performed on location 52 using locations 48 and 56. Locations 50 and 54 are temporarily ignored so that chroma values for location 52 are generated using the above methods of a 4:2:2 to 4:4:4 up-conversion. Next, with chroma values for location 52 (from the first step), the same technique is used twice to generate chroma values for locations 50 and 54. The generation of chroma values for locations 50 and 54, both of which use the "new" chroma values of location 52, may be done either in series or in parallel.

Preferably, the chroma up-conversion process is performed for sample locations aligned horizontally, not vertically or diagonally. This is because the values for samples locations that are horizontally adjacent are typically located relatively close together in a frame buffer format in a raster based system. Chroma up-conversion on horizontally aligned samples thus requires a minimal amount of data storage. Using vertically or diagonally aligned sample locations would generally require access to a much larger block of video data in order to perform the up-conversion. For interlaced video formats, the separation of adjacent rows in the video data storage media increases, requiring much larger data storage. Should a particular frame buffering format store vertically adjacent rows near each other, or should techniques be found for quickly accessing non-contiguous data, the present invention could easily be adapted to use vertically or diagonally aligned data for chroma up-conversion. The present invention is not intended to be limited to any particular alignment of sample locations for use in edge-adaptive chroma up-conversion.

Converting from a 4:2:0 YUV format, such as shown in FIG. 5, to a 4:4:4 YUV format may also be performed using the present invention. Preferably, this chroma up-conversion is performed horizontally on a single row at a time, for the reasons stated above. However, there is no mathematical barrier to locating edges diagonally or vertically, instead of horizontally, only the problems of data storage and the related effect on speed. In two embodiments of the present invention, a row containing only chroma samples is "copied" for use with the next two (lower) rows containing only luma data. From this point, there are at least two techniques that may be used.

In one embodiment, the sample locations 26 with chroma values 32 may be shifted slightly to the right. This method is often referred to as the "nearest neighbor on the left." Using this technique, the chroma samples are assumed to be from the same location as the closest luma sample on the right. This method essentially transforms the 4:2:0 YUV format into a 4:2:2 YUV format, at the cost of introducing some color "smudging" from movement of the chroma sampling locations.

In another embodiment, instead of shifting the assumed chroma sample location to the right, a distance-based horizontal linear interpolation is performed. That is, the value of the adjacent chroma sample values (on the right) are used to adjust the values of the current chroma sample values before shifting the location to coincide with the location of the luma sample. Again, the result is the creation of a 4:2:2 YUV format, which may be processed as described above. The amount of color smudging is reduced slightly, at the cost of performing more interpolations.

Those of ordinary skill in the art will recognize that processing chroma samples downward and to the right is consistent with a typical frame buffer format. However, such processing schemes tend to omit the top row and left-most column of luma sample locations. Many methods are available for up-converting chroma values along these boundaries, such as copying the chroma values from an adjacent row or column. The present invention is not intended to be limited to any particular method of up-converting chroma values only a boundary.

The present invention may implemented in software or firmware, as well as in programmable gate array devices, ASICs and other otherware.

While embodiments and applications of this invention have been shown and described, it would be apparent to those skilled in the art that many more modifications than mentioned above are possible without departing from the inventive concepts herein after a review of this disclosure.

The invention, therefore, is not to be restricted except in the spirit of the appended claims.

What is claimed is:

1. A method for expanding chroma values of a graphic image, comprising:

selecting a first location, with a stored luma value, for creating a set of new chroma values;

selecting a second location and a third location, both locations with stored luma and chroma values, said second and said third locations adjacent to said first location;

reading a set of stored luma values from said first, said second and said third locations;

reading a set of stored chroma values from said second and said third locations;

calculating a luma gradient from said set of stored luma values;

selecting a weight coefficient based on said luma gradient; and generating the set of new chroma values for said first location from said weight coefficient and said stored chroma values.

2. A method in accordance with claim 1, further comprising:

selecting said weight coefficient from said luma gradient with a step-function.

3. A method in accordance with claim 1, wherein:

reading said set of stored luma values and reading said set of stored chroma values is done from a 4:2:2 format file.

4. A method in accordance with claim 1, wherein:

reading said set of stored luma values and reading said set of stored chroma values is done from a 4:1:1 format file.

5. A method in accordance with claim 1, wherein:

reading said set of stored luma values and reading said set of stored chroma values is done from a type-1 4:2:0 format file.

6. A method in accordance with claim 1, wherein:

reading said set of stored luma values and reading said set of stored chroma values is done from a type-2 4:2:0 format file.

7. A method in accordance with claim 1, wherein:

the new chroma values are generated in a 4:4:4 format.

8. An apparatus for expanding compressed graphic data at an image location for display on a computer system, comprising;

an edge detector for locating an edge of an image in the luma plane; and a chroma expander responsive to said edge detector for generating a set of new chroma values, said set of new chroma values, when combined with the compressed graphic data, having an edge in the chroma planes at the same location as the edge in the luma plane.

9. An apparatus for expanding compressed graphic data at an image location for display on a computer system, comprising;

a chroma reader reading stored chroma values at a plurality of chroma sampling locations;

a luma gradient calculator calculating a variation in stored luma samples among a plurality of luma sample locations; and a chroma expander responsive to said luma gradient calculator generating a new set of chroma values for the image location.

10. An apparatus in accordance with claim 9, wherein:

said plurality of luma sampling locations includes said plurality of chroma sampling locations.

11. An apparatus in accordance with claim 9, further comprising:

an interpolation function storing a weight factor receives an input from said luma gradient calculator and outputs said weight factor to said chroma expander, said weight factor reflecting the relative influence of said stored chroma samples based on said variation in said stored luma samples.

12. An apparatus in accordance with claim 11, wherein:

said interpolation function is a step-function.

13. A computer system for displaying graphic data stored in a compressed format, said system comprises:

a compressed graphics data reader for accessing and reading the compressed graphic data;

an edge adaptive chroma up-conversion engine for expanding a set of compressed chroma data and creating a new set of expanded graphic data, said edge-adaptive chroma up-conversion engine coupled to said compressed graphic data reader and responsive to a set of uncompressed luma data; and a display format converter for converting said expanded graphic data to a computer monitor display format, said converter coupled to said chroma up-conversion engine and said computer monitor.

14. A computer system in accordance with claim 13, wherein:

said set of compressed chroma data is in a 4:2:2 format.

15. A computer system in accordance with claim 13, wherein:

said set of compressed chroma data is in a 4:1:1 format.

16. A computer system in accordance with claim 13, wherein:

said set of compressed chroma data is in a type-1 4:2:0 format.

17. A computer system in accordance with claim 13, wherein:

said set of compressed chroma data is in a type-2 4:2:0 format.

18. A computer system in accordance with claim 13, wherein:

said set of expanded graphic data is 4:4:4.

19. A program storage device readable by a machine, tangibly embodying a program of instructions executable by the machine to perform a method for expanding chroma values of a graphic image, the method comprising:

selecting a first location, with a stored luma value, for creating a set of new chroma values;

selecting a second location and a third location, both locations with stored luma and chroma values, said second and said third locations adjacent to said first location;

reading a set of stored luma values from said first, said second and said third locations;

reading a set of stored chroma values from said second and third locations;

calculating a luma gradient from said set of stored luma values;

selecting a weight coefficient based on said luma gradient; and generating the set of new chroma values for said first location from said weight coefficient and said stored chroma values.

* * * * *

UNITED STATES PATENT AND TRADEMARK OFFICE
CERTIFICATE OF CORRECTION

PATENT NO. : 6,297,801 B1
DATED : October 2, 2001
INVENTOR(S) : Jiang

It is certified that error appears in the above-identified patent and that said Letters Patent is hereby corrected as shown below:

<u>Column 5,</u>
Line 7, replace

"$Min(Y_{-1}, Y_{i+1}) - \delta_L \leq Y_i \leq Max(Y_{i-1}, Y_{i+1}) + \delta_H \alpha_i(Y) = |Ygradient|$" with --
"$Min(Y_{i-1}, Y_{i+1}) - \delta_L \leq Y_i \leq Max(Y_{i-1}, Y_{i+1}) + \delta_H \alpha_i(Y) = |Ygradient|$ --.

Line 10, "$\alpha_{i(Y)} = 1/2$" with -- $\alpha_i(Y) = 1/2$ --

Line 40, after "and the" delete "8".
Line 40, after "weight" delete "a"-.

Signed and Sealed this

Twenty-sixth Day of March, 2002

Attest:

*Attesting Officer*

JAMES E. ROGAN
*Director of the United States Patent and Trademark Office*